US007799446B2

United States Patent
Mukai

(10) Patent No.: US 7,799,446 B2
(45) Date of Patent: Sep. 21, 2010

(54) PERPENDICULAR MAGNETIC RECORDING MEDIUM AND MANUFACTURING METHOD THEREOF, MAGNETIC RECORDING APPARATUS

(75) Inventor: Ryoichi Mukai, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 12/024,418

(22) Filed: Feb. 1, 2008

(65) Prior Publication Data
US 2008/0198512 A1    Aug. 21, 2008

(30) Foreign Application Priority Data
Feb. 20, 2007    (JP)    ............................. 2007-039585

(51) Int. Cl.
*G11B 5/66*    (2006.01)
(52) U.S. Cl. .................................................. 428/831.2
(58) Field of Classification Search ........................ None
See application file for complete search history.

(56) References Cited

U.S. PATENT DOCUMENTS

| | | | | |
|---|---|---|---|---|
| 6,709,768 B2 * | 3/2004 | Takahashi et al. | ......... | 428/836.1 |
| 6,759,138 B2 * | 7/2004 | Tomiyasu et al. | ......... | 428/828.1 |
| 6,893,741 B2 * | 5/2005 | Doerner et al. | .............. | 428/670 |

(Continued)

FOREIGN PATENT DOCUMENTS

CN    1674104 A    9/2005

(Continued)

OTHER PUBLICATIONS

Mukai et al., "Signal-to-media-noise ratio improvement of CoCrPt-SiO2 granular perpendicular media by stacked Ru underlayer", J Appl. Phys., vol. 97, 2005, pp. 10N119-1 to 10N119-3.*

(Continued)

*Primary Examiner*—Holly Rickman
(74) *Attorney, Agent, or Firm*—Greer, Burns & Crain, Ltd.

(57) ABSTRACT

A perpendicular magnetic recording medium comprises a soft-magnetic backing layer formed on a substrate, an orientation control layer formed on the soft-magnetic backing layer, a first foundation layer of a continuous film of Ru or a Ru alloy formed on the orientation control layer, a second foundation layer including a plurality of crystal grains of Ru or a Ru alloy formed on the first foundation layer with a gap separating the plurality of crystal grains from each other, and a recording layer including a plurality of magnetic particles formed on the second foundation layer respectively in correspondence to the plurality of crystal grains, each of the magnetic particles having an easy axis of magnetization in a direction generally perpendicular to a substrate surface, and a non-magnetic grain boundary phase isolating said plurality of magnetic particles from each other, wherein the first foundation layer comprises a plurality of crystal grains formed in contact with each other at respective grain boundaries, one of the plurality of crystal grains constituting the second foundation layer being formed in correspondence to one of the plurality of crystal grains constituting the first foundation layer, and wherein there are provided a plurality of nuclei at an interface between the crystal grain of the second foundation layer corresponding to the one crystal grain of the plurality of crystal grains constituting the first foundation layer and the orientation control layer.

12 Claims, 11 Drawing Sheets

U.S. PATENT DOCUMENTS

| | | | |
|---|---|---|---|
| 7,067,206 B2 * | 6/2006 | Uwazumi et al. | 428/831.2 |
| 7,175,925 B2 * | 2/2007 | Chen et al. | 428/831 |
| 7,368,185 B2 * | 5/2008 | Hirayama et al. | 428/831.2 |
| 7,722,967 B2 * | 5/2010 | Marinero et al. | 428/831.2 |
| 2005/0214520 A1 | 9/2005 | Oikawa et al. | |
| 2005/0255336 A1 | 11/2005 | Mukai | |
| 2005/0255337 A1 | 11/2005 | Mukai | |

FOREIGN PATENT DOCUMENTS

| | | |
|---|---|---|
| CN | 1707624 A | 12/2005 |
| JP | A 2003-217107 | 7/2003 |
| JP | A 2003-346334 | 12/2003 |
| JP | A 2005-353256 | 12/2005 |
| JP | A 2006-309919 | 11/2006 |
| KR | 20060047822 | 5/2006 |

OTHER PUBLICATIONS

Ryoichi Mukai et al., "Signal-to-media-noise ratio improvement of $CoCrPt-SiO_2$ granular perpendicular media by stacked Ru underlayer;" J. Appl. Phy. vol. 97, Issue 10, May 17, 2005.

* cited by examiner

PERPENDICULAR MAGNETIC RECORDING MEDIUM AND MANUFACTURING METHOD THEREOF, MAGNETIC RECORDING APPARATUS

CROSS-REFERENCE TO RELATED APPLICATION

The present application is based on Japanese priority application No. 2007-039585 filed on Feb. 20, 2007, the entire contents of which are hereby incorporated by reference.

BACKGROUND OF THE INVENTION

The present invention generally relates to perpendicular magnetic recording medium, manufacturing method thereof and further to a magnetic recording apparatus, and more particularly to a perpendicular magnetic recording medium having a magnetic layer in which magnetic particles are isolated by a non-magnetic material.

Magnetic recording apparatus such as hard disk apparatus has the feature of low memory cost per bit and is capable of realizing large storage capacity. Thus, magnetic recording apparatuses are used extensively in personal computers, and the like, as digital signal recording apparatus. On the other hand, hard disk apparatuses are used also in various audio-visual applications, and there is a skyrocketing increase of demand for hard disk apparatuses. On the other hand, in relation to the purpose of recording video signals, there exist demands for hard disk apparatuses of further increased storage capacity.

In order to attain the desired increase of recording capacity and decrease of cost in magnetic recording apparatuses at the same time, it is effective to increase the recording density of the recording medium. With increase of recording medium, it becomes possible to reduce the number of the recording media in the recording apparatus, while this leads to decrease of the number of magnetic heads. As a result of decrease of the number of components, it becomes possible to decrease the cost of the magnetic recording apparatus.

For the improvement of recording density of magnetic recording media, it is necessary to improve the resolution and improve the signal-to-noise ratio (S/N ratio) by reducing noise. This reducing of noise has been proceeded conventionally by decreasing the grain diameter of the magnetic particles constituting the recording layer and further isolating the magnetic particles magnetically in the magnetic recording medium.

Patent Reference 1
  Japanese Laid-Open Patent Application 2003-217107

Patent Reference 2
  Japanese Laid-Open Patent Application 2003-346334

Patent Reference 3
  Japanese Laid-Open Patent Application 2005-353256

Patent Reference 4
  Japanese Laid-Open Patent Application 2006-309919

Generally, a perpendicular magnetic recording medium has a construction of laminating a recording layer on a soft magnetic backing layer of a soft magnetic material formed on a substrate. A recording layer is generally formed of a CoCr alloy and is formed by sputtering the CoCr alloy while heating the substrate. According to such a process, it becomes possible to form magnetic particles of the CoCr alloy of Co-rich composition in the state non-magnetic Cr is segregated at the grain boundary of the magnetic particles. Thereby, it becomes possible to isolate the magnetic particles magnetically with each other.

On the other hand, the soft-magnetic backing layer is the layer used for providing a path of the magnetic flux returning to the magnetic head. Thus, when a crystalline state material is used for the soft-magnetic backing layer, there arises a problem of spike noise formation as a result of formation of magnetic domains. Thus, it is generally practiced to form the soft-magnetic backing layer by using amorphous state material or microcrystalline state material, in which formation of magnetic domains is not likely. However, with such a construction, there is imposed a limitation with regard to the annealing temperature at the time of formation of the recording layer in viewpoint of avoiding crystallization of the soft magnetic backing layer. Thus, there can be a case in which the segregation of Cr does not proceed sufficiently, resulting in incomplete magnetic isolation of the magnetic particles.

Meanwhile, there is a proposal of a recording layer capable of promoting isolation of the magnetic particles and at the same time not necessitating high temperature annealing, wherein the recording layer of this proposal has the construction of forming magnetic particles of CoCr alloy in a non-magnetic matrix of $SiO_2$ in mutually isolated state. Further, there is a proposal of the technology of forming a Ru film as the foundation layer of the recording layer and causing the growth of the magnetic particles in the recording layer in the direction perpendicular to the substrate surface, such that there is formed a columnar structure in which the c-axes of the magnetic crystals are aligned in the recording layer in the direction perpendicular to the substrate surface and such that the magnetic particles are grown with generally equal interval in the magnetic layer. Reference should be made to Patent References 1-2.

Meanwhile, in the case a Ru film is merely formed as the foundation of the recording layer, it should be noted that the magnetic particles grow merely on the surface of the crystal grains of the Ru film. Thus, depending on the size or arrangement of the crystal particles, there can be a case in which magnetic particles are coupled with each other and the desired isolation of the magnetic particles is not attained. Further, there is a concern that there occurs spreading of grain diameter distribution for the magnetic particles, resulting in increase of the medium noise.

When to form the adjacent magnetic particles with generally uniform interval, on the other hand, there is a need of providing a seed layer at the underside of the Ru film, while such a construction requires a lamination of a plurality of seed layers. Thus, there arises a problem of increase of thickness of the seed layer. Further, when such a thick seed layer is interposed between the recording layer and the soft-magnetic backing layer, there is caused increase of distance between the soft-magnetic backing layer and the recording layer, while this leads to the problem of increase of head magnetic field necessary at the time of recording. Further, there occurs spreading of the head magnetic field, while this leads to the problem of side-erasing of information in which the information on the adjacent track is erased because of the spread head magnetic field.

In relation to the foregoing problems, the inventor of the present invention has proposed previously a perpendicular magnetic recording medium that uses a recording layer having a columnar granular structure, a manufacturing method thereof, and a magnetic recording apparatus, wherein the size distribution of the magnetic particles is improved and the magnetic particles are distributed uniformly. Reference should be made to Patent Reference 3.

FIGS. 1 and 2 show the construction of a perpendicular magnetic recording medium 60 of the foregoing proposal as a related art of the present invention.

Referring to FIG. 1, the magnetic recording medium 60 includes a soft-magnetic backing layer 2 formed on a substrate 1, wherein the soft-magnetic backing layer 2 carries thereon a grain growth nucleation layer 61 via an orientation control layer 3 that controls the orientation of the magnetic particles in the recording layer to be formed on the soft-magnetic backing layer 2. For the orientation control layer 3, an amorphous layer of Ta may be used, for example.

Referring to FIG. 2, the grain growth nucleation layer 61 is formed of island patterns 61a of Pt, or the like, formed on the orientation control layer 3 uniformly and with generally equal interval, and there is formed a first foundation layer 21 of Ru crystal grains 21a of generally identical grain diameter, wherein the Ru crystal grains 21a are grown respectively in correspondence to the island patterns 61a.

Further, on the first foundation layer 21, there is formed a second foundation layer 4 of Ru as shown in FIG. 1, wherein the second foundation layer 4 is formed as an assembly of columnar Ru crystal grains 4a respectively grown from the Ru crystal grains 21a in the first foundation layer 21. Here, it should be noted that the Ru columnar crystal grains 4a are grown epitaxially in the foundation layer 4 with respect to the Ru crystal grains 21a with a gap 4b.

Further, there are formed, on the second foundation layer 4, columnar crystal grains 5a of CoCrPt grown epitaxially to the Ru crystal grains 4a in the second foundation layer 4, wherein the CoCrPt crystal grains 5a are isolated with each other by an $SiO_2$ grain boundary phase 5b and constitute a recording layer 5. With such a construction, it should be noted that the CoCrPt crystal grains are oriented such that the c axes thereof are aligned perpendicularly to the substrate 1 and have an easy axis of magnetization in the direction perpendicular to the substrate 1.

Further, the recording layer 5 is covered with a protective film 6.

Thus, with the perpendicular recording medium 60 of FIGS. 1 and 2, the magnetic crystal grains 5a each having the easy axis of magnetization aligned perpendicularly to the substrate 1 are disposed via the non-magnetic grain boundary phase 5b, and thus, isolation of the magnetic particles is promoted. Thereby, the perpendicular magnetic recording medium 60 shows the feature of reduced medium noise.

On the other hand, with the perpendicular recording medium 60 of FIGS. 1 and 2, there is a need of forming the island patterns 61a on the orientation control layer 3 with generally equal interval as shown in FIG. 2, while formation of such island patterns 61a requires a complex process such as mask process, and thus, the perpendicular magnetic recording medium 60 cannot avoid the problem of increase of manufacturing cost.

SUMMARY OF THE INVENTION

According to an aspect of an embodiment, a perpendicular magnetic recording medium and a magnetic recording apparatus that uses such a perpendicular magnetic recording medium, having:

a substrate;

a soft-magnetic backing layer formed over said substrate;

an orientation control layer formed over said soft-magnetic backing layer;

a first foundation layer of a continuous film of Ru or a Ru alloy formed on said orientation control layer;

a second foundation layer comprising a plurality of crystal grains of Ru or a Ru alloy formed on said first foundation layer with a gap separating said plurality of crystal grains from each other; and a recording layer comprising a plurality of magnetic particles formed on said second foundation layer respectively in correspondence to said plurality of crystal grains, each of said plurality of magnetic particles having an easy axis of magnetization in a direction generally perpendicular to a substrate surface, and a non-magnetic grain boundary phase isolating said plurality of magnetic particles from each other, wherein said first foundation layer comprises a plurality of crystal grains formed in contact with each other at respective grain boundaries, one of said plurality of crystal grains constituting said second foundation layer being formed in correspondence to one of said plurality of crystal grains constituting said first foundation layer, and wherein there are provided a plurality of nuclei at an interface between said crystal grain of said second foundation layer corresponding to said one crystal grain of said plurality of crystal grains constituting said first foundation layer and said orientation control layer.

According to an aspect of an embodiment, there is provided a method for manufacturing a perpendicular magnetic recording medium, said perpendicular magnetic recording medium including:

a substrate;

a soft-magnetic backing layer formed over said substrate;

an orientation control layer formed over said soft-magnetic backing layer;

a first foundation layer of a continuous film of Ru or a Ru alloy formed on said orientation control layer;

a second foundation layer of a plurality of crystal grains of Ru or a Ru alloy formed on said first foundation layer and a gap separating said plurality of crystal grains from each other; and a recording layer comprising a plurality of magnetic particles formed on said second foundation layer in correspondence to said plurality of crystal grains, each of said plurality of crystal grains having an easy axis of magnetization in a direction perpendicular to a substrate surface, and a non-magnetic phase isolating said plurality of magnetic particles from each other, said method comprising the steps of:

depositing nuclei on said orientation control layer by a sputtering process with mutual separation; and forming said first foundation layer in the form of said continuous film of Ru or said Ru alloy by depositing Ru or said Ru alloy by sputtering upon said orientation control layer on which said nuclei are formed.

According to the present invention, it becomes possible to form crystal gains in the first foundation layer to have generally an identical grain diameter over an entire surface of said substrate by forming said nuclei on said orientation control layer by sputtering and forming said first foundation layer thereon in the form of the continuous film of Ru or Ru alloy. Thereby, it becomes possible to control the crystal grains in the second foundation layer in accordance with the grain diameter of the crystal grains in the first foundation layer. As a result, the distribution of the crystal grain diameter in the second foundation layer is reduced, while this results in a decrease of distribution of the grain diameter also in the recording layer. As a result of decrease of variation of the magnetic crystals in the recording layer, the perpendicular magnetic recording medium has improved signal-to-noise ratio and improved writing characteristics. Further, there is attained a decrease of width of the region where writing is made.

DETAILED DESCRIPTION OF THE PREFERRED EMBODIMENTS

Principle

Figure 1:
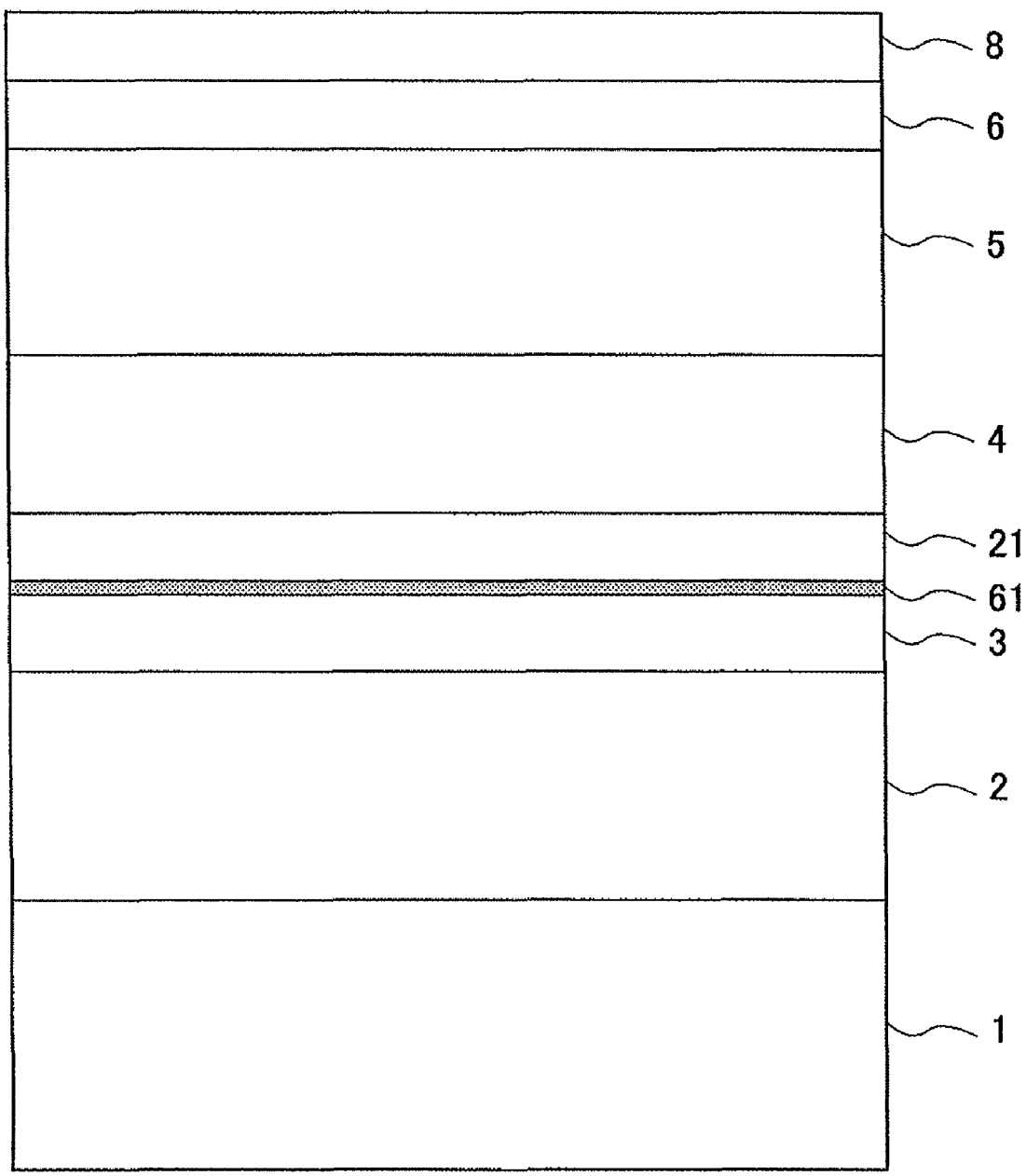
FIG. 1 is a diagram showing the construction of a perpendicular magnetic recording medium according to a related art of the present invention.

Hereinafter, the principle of the present invention will be explained with reference to FIGS. 3A-3D. In the drawings, those parts explained before are designated by the same reference numerals and the description thereof will be omitted.

FIGS. 3A-3D are diagrams showing the process of forming the first foundation layer 21 on the orientation control layer 3 according to the present invention.

Figure 3A:
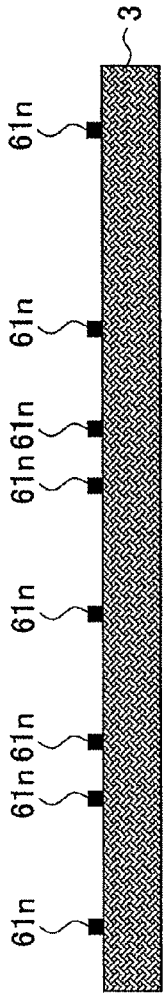
FIGS. 3A-3D are diagrams explaining the principle of the present invention.

Referring to FIG. 3A, Pt particles are formed at first with the present invention on a Ta film constituting the orientation control layer 3 as growth nuclei 61n with a random but uniform distribution over the entire surface of the substrate 1.

Figure 2:
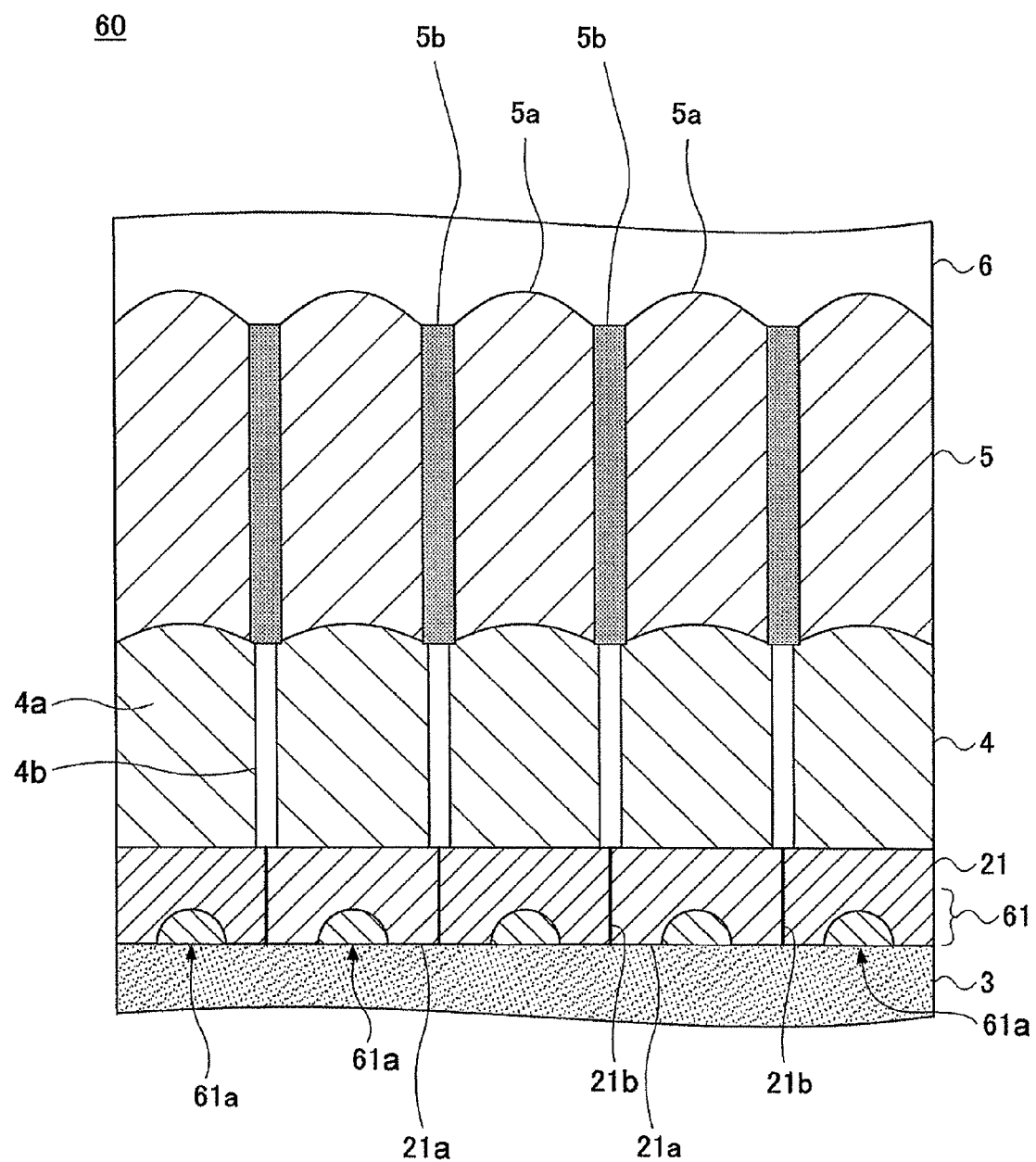
FIG. 2 is a diagram showing a part of the perpendicular magnetic recording medium of FIG. 1 in detail.

For example, it is possible to form the growth nuclei 61n of Pt on the Ta orientation control layer 3 such that there exists at least one nucleus 61n in an area corresponding to the area occupied by a single Ru crystal grain 21a (average grain diameter 9.1 nm) in the Ru foundation layer 21, which is to be formed, by carrying out a sputtering process that uses a Pt target in the step of FIG. 3A under a rare gas pressure of an Ar gas, for example, of 5.33 Pa (40 mTorr) at a room temperature with a small deposition rate of 0.5 nm/second for a duration corresponding to the deposition of the thickness of about 1 nm, such as the duration of about 2 seconds. It should be noted that such nuclei 61n may be anything as long as it is used for the growth nuclei in the next process. Thus, each nucleus 61n may be formed of a single Pt particle or an aggregate of a plurality of Pt particles. Further, in the case the nuclei 61n are formed by the sputtering process, each nucleus 61 has a size much smaller than the island pattern 61a of FIG. 2, which was formed by a patterning process.

Figure 3B:
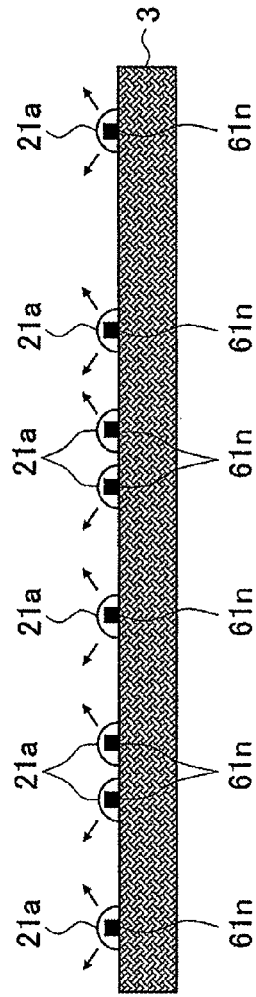
Figure 3C:
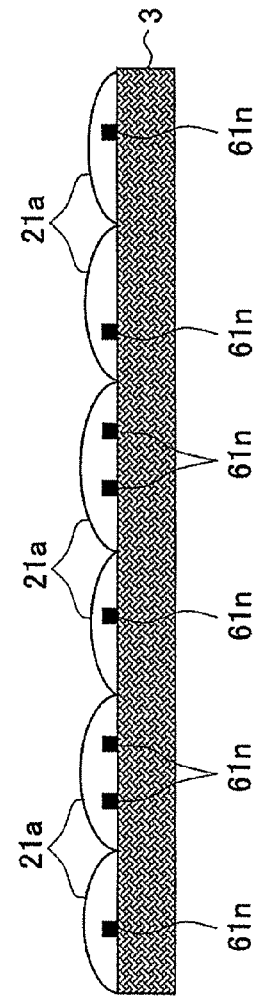
Figure 3D:
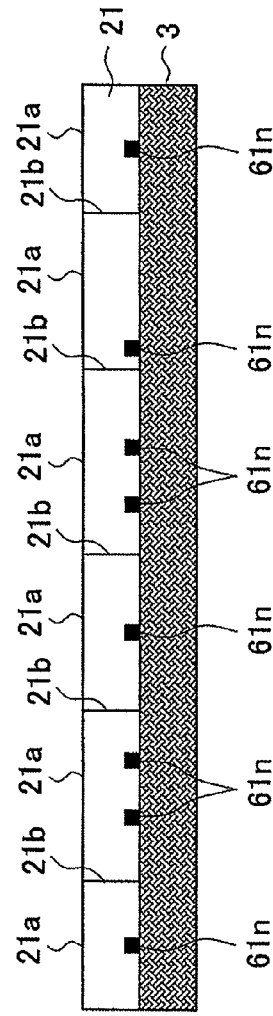

Next, in the steps of FIGS. 3B-3D, the foundation layer 21 of Ru is formed on the structure of FIG. 3A by a sputtering process that uses a Ru target, wherein the sputtering process is conducted with a relatively large deposition rate of 2.5 nm/second under the rare gas pressure of 0.667 Pa (5 mTorr) of Ar gas at the room temperature. Thereby, the foundation layer 21 is formed with a film thickness of 10 nm.

Thereby, as shown in FIG. 3B, the growth of the Ru crystal grains 21a constituting the Ru film 21 is started from the nuclei 21n of random distribution as shown in FIG. 3A, wherein it should be noted that the crystal grains 21a experience merging with each other as they grow, and there appears, in due course of time, an equigranular structure of Ru crystals 21a having generally the same grain diameter shown in FIG. 3C as an equilibrium state. With the structure of FIG. 3C, the Ru crystal grains 21a have an average grain diameter of about 9.1 nm, for example, and respective in-plane orientations and are in contact with each other at a grain boundary 21b. In the case the Ru crystal grains 21a of generally the same grain diameter are contacted with each other at the grain boundary 21b with different in-plane orientations, there occurs a competing process in that one grain tends to swallow the other grain or vice versa, and thus, in the final equilibrium state, a Ru continuous film having the microstructure in that the Ru crystal grains 21a of generally the same grain diameter are adjacent with is each other at the grain boundary 21b is obtained as the foundation film 21.

In the present embodiment, it is preferable that the orientation control layer 3 is formed to have a film thickness of 2.0 nm or more. The Ru crystal grains 21a, and thus the Ru foundation layer 21, may be an alloy containing any of Co, Cr, Fe, Ni, W and Mn.

Further, the crystal nuclei 61n are not limited to Pt but may be formed of W, Ag, Au, or the like, or may be formed of an alloy containing one or more of these elements.

Further, the nuclei 61n may be formed of any of Ru, a Ru alloy, Ti, Ta, Co and a CoPt alloy. In this case, the Ru alloy may contain, in addition to Ru, Co, Co, Fe, Ni, W and Mn.

It should be noted that with such a Ru layer 21, it is possible to control the grain diameter of the Ru crystals 21a therein to some extent by controlling the film thickness thereof. Thus, in the case the film thickness of the Ru layer 21 is increased, there is caused an increase of grain diameter of the Ru crystal grains 21a.

First Embodiment

Figure 4:
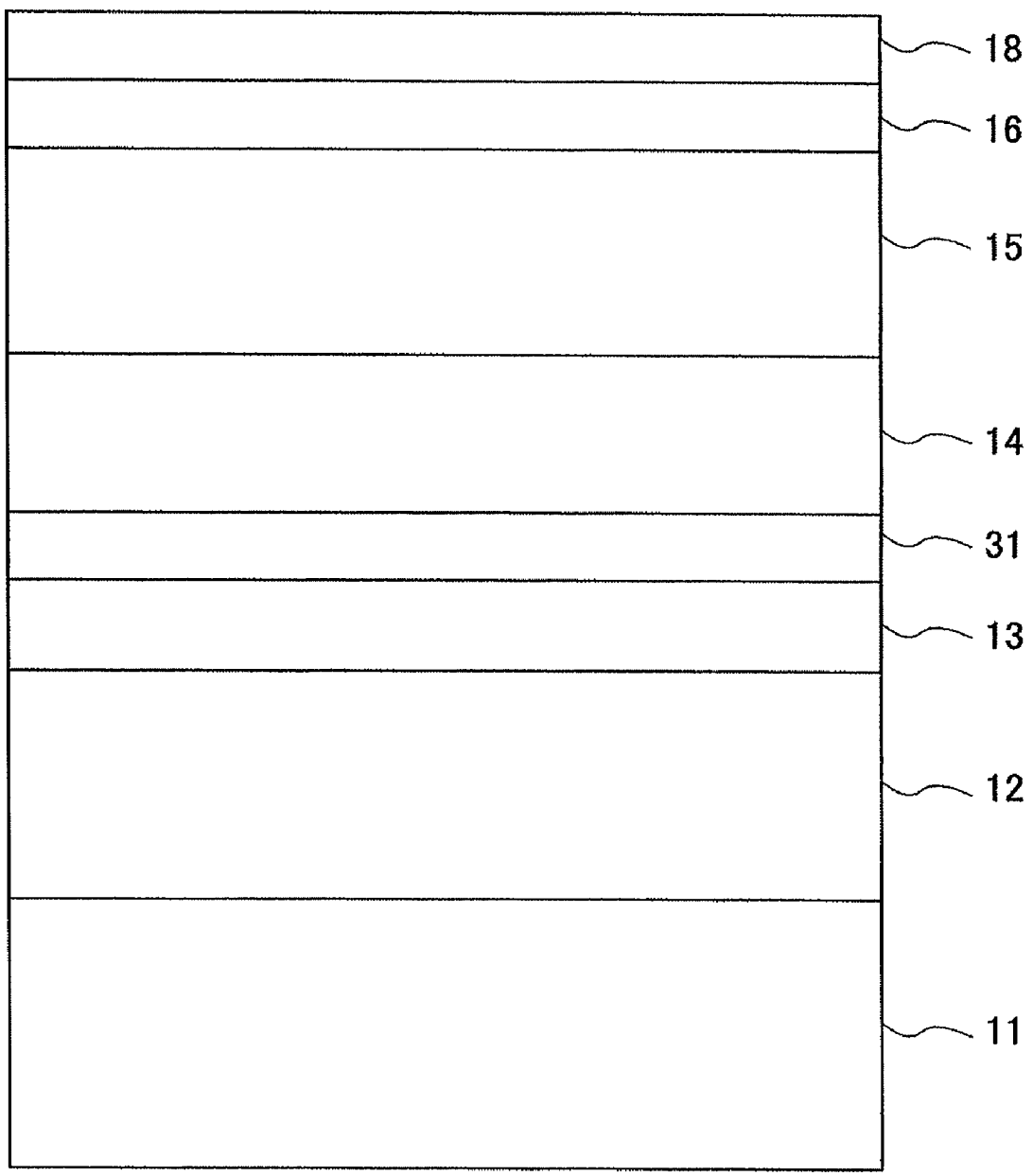
FIG. 4 is a diagram showing the construction of a perpendicular magnetic recording medium according to a first embodiment of the present invention.
Figure 5:
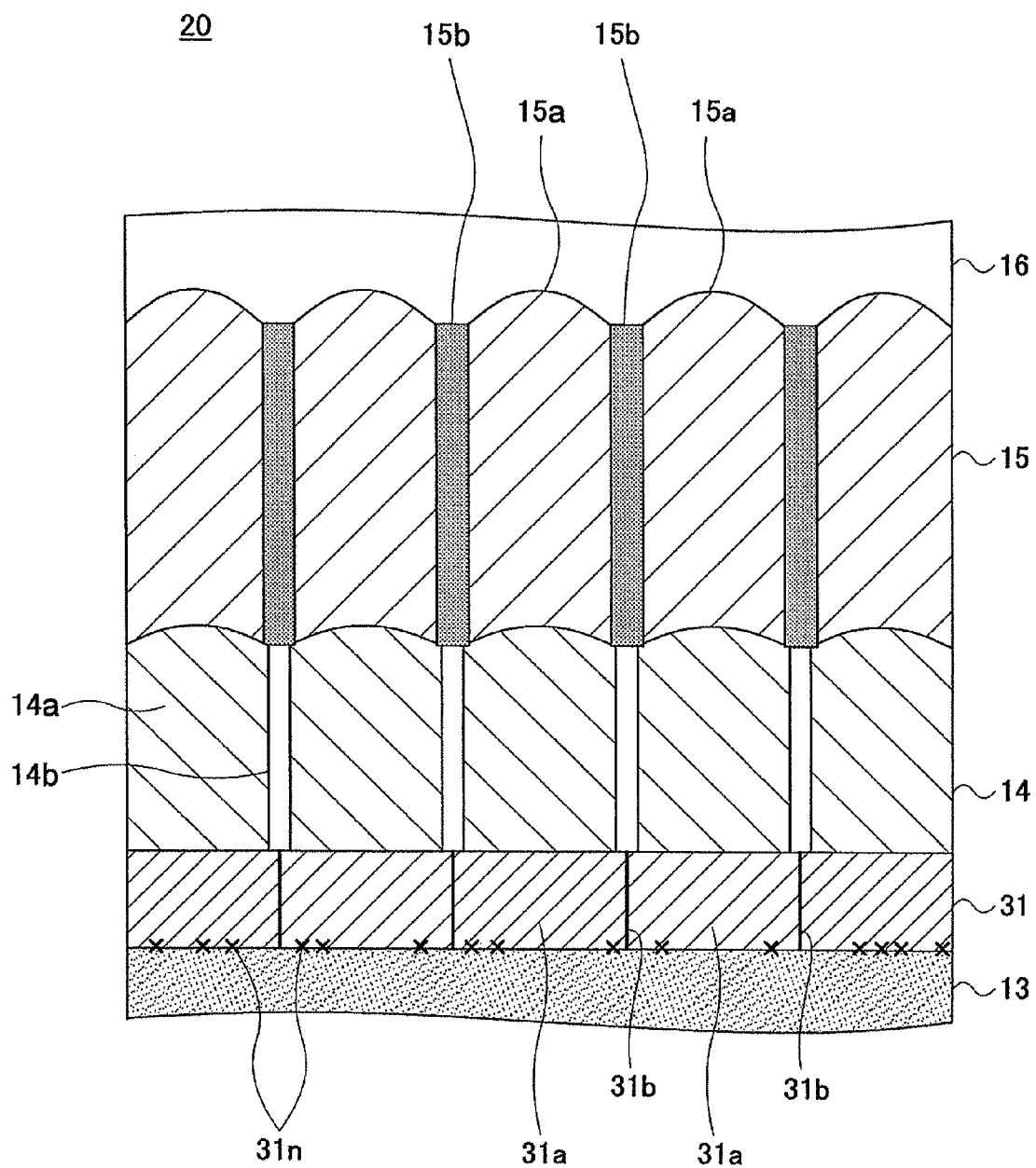
FIG. 5 is a diagram showing a part of the perpendicular magnetic recording medium of FIG. 4 in detail.

FIGS. 4 and 5 show the construction of perpendicular magnetic recording medium 20 according to a first embodiment of the present invention.

Referring to FIGS. 4 and 5, the perpendicular magnetic recording medium 20 of the present embodiment is constructed on a substrate 11 and includes a soft-magnetic backing layer 12 formed on the substrate 11, an orientation control layer 13 formed on the soft-magnetic backing layer 12, a first foundation layer 31 formed on the orientation control layer 13, a second foundation layer 14 formed on the first foundation layer 31, a recording layer 15 formed on the second foundation layer 14, a protective film 16 formed on the recording layer 15, and a lubrication layer 18 formed on the protective film 16. Further, with the second foundation layer 14, it should be noted that the crystal grains constituting the foundation layer 14 are formed with mutual separation.

With the perpendicular magnetic recording medium 20 of such a construction, the magnetic particles constituting the recording layer 15 are grown epitaxially on the crystal grains in the second foundation layer 14, and thus, isolation of the magnetic particles are promoted. Thereby, the medium noise is reduced and a perpendicular magnetic recording medium suitable for high-density recording is realized.

The substrate 11 may be any of a plastic substrate, a crystallized glass substrate, tempered glass substrate, a Si substrate, an aluminum alloy substrate, or the like. In the case the perpendicular magnetic recording medium 10 is a taped-formed medium, it is possible to use a film of polyester (PET), polyethylene naphthalate (PEN), heat-resistant polyimide (PI), and the like. Because the present invention does not use substrate heating, there arises no problem even when such a resin substrate is used.

The soft-magnetic backing layer 12 may have a film thickness of 50 nm-2 μm and is formed of an alloy of amorphous or microcrystalline state containing at least one element selected from the group consisting of Fe, Co, Ni, Al, Si, Ta, Ti, Zr, Hf, V, Nb, C and B or a stacking of films of such an alloy. From the viewpoint of concentrating the recording magnetic field, it is preferable to use a soft-magnetic material of the saturation magnetic flux density Bs of 1.0 T or more for the soft-magnetic backing layer 21. For example, it is possible to use FeSi, FeAlSi, FeTaC, CoZrNb, CoCrNb, NiFeNb, or the like, for this purpose. The soft-magnetic backing layer 12 may be formed by a plating process, sputtering process, evaporation deposition process, CVD (chemical vapor deposition) process, or the like. The soft-magnetic backing layer 12 is provided for the purpose of absorbing almost all the magnetic flux from the recording head, and thus, it is preferable that the soft-magnetic backing layer 12 provides a large value for the product of the saturation magnetic flux density Bs and the film thickness from the viewpoint of carrying out saturation recording. Further, it is preferable that the soft-magnetic backing layer 12 has a large high-frequency permeability from the viewpoint of writing data with high transfer rate.

The orientation control layer 13 may have a film thickness of 1.0 nm-10 nm, for example, and is formed of at least one material of amorphous state Ta, Ti, C, Mo, W, Re, Os, Hf, Mg, Pt, or an alloy thereof, or may be formed of NiP. The orientation control layer 13 performs the function of controlling the orientation of the crystal grains of the foundation layers 31 and 14 formed thereon such that the c-axes thereof are aligned generally perpendicularly to the substrate surface and distributing the crystal grains of the foundation layers 31 and 14 with in-plane uniformity. From the viewpoint of crystal orientation control of the foundation layers 31 and 14, it is preferable to form the orientation control layer 13 by Ta. Further, it is preferable that the orientation control layer 13 is formed of a mono layer in view of forming the soft-magnetic backing layer and the recording layer as close as possible. Thus, it is preferable that the orientation control layer 13 has a film thickness of 1.0 nm to 5 nm, particularly 2.0 nm or less. Further, it is possible to form the orientation control layer 13 by laminating the foregoing film in the from of plural layers.

Now, the first layer 31 formed on the orientation control layer 13 corresponds to the Ru continuous film 21 explained previously with reference to FIGS. 3A-3D, and thus, the foundation layer 31 includes therein the equilibrium structure that appears as a result of the competitive growth process of the Ru crystal grains 31a started from the nuclei 31n, which in turn are distributed random on the orientation control layer 31.

Such nuclei 31n are formed as islands and hence in discrete state by carrying out a sputtering process at the room temperature by using a Pt target under the rare gas pressure of 5.33 Pa (40 mTorr) with a very small deposition rate of 0.5 nm/second for the duration corresponding to the deposition of the film of the thickness of 1 nm, and hence for the duration of about 2 seconds. There, a d.c. magnetron sputtering process may be used. The nuclei 31n thus formed distribute random on the orientation control layer 13. It should be noted that such nuclei 31n may be formed of a single Pt particle or an aggregate of a plurality of Pt particles. Further, in the case the nuclei 31n are formed by the sputtering process, each nucleus 31n has a size much smaller than the island pattern 61a of FIG. 2, which was formed by a patterning process.

On the other hand, the foundation layer 31 is formed with the thickness of 10 nm by carrying out the sputtering process of room temperature on the orientation control layer 31 thus formed with the nuclei 31n while using a Ru target in a rare gas such as an Ar gas of the pressure of 0.667 Pa (5 mTorr) with a relatively large deposition rate of 2.5 nm/second, for example.

Thereby, with the foundation layer 31, the growth of the Ru crystals 31a is started from the respective nuclei 31n as explained previously with reference to FIGS. 3A-3D, wherein the crystal grains 31a undergo rapid growth by merging with each other when the crystal grains 31a have a small grain diameter. In due course of time, there appears an equigranular structure of the Ru crystal grains of the generally identical grain diameter of 9.1 nm, for example, as showing in FIG. 3C. Ultimately, there is formed a continuous film of Ru having the microstructure showing in FIG. 5 in which the Ru crystal grains 31 of generally the uniform grain diameter are contacted with each other at the grain boundary 31b as the foundation film 31. Here, each of the Ru crystal grains 31a has one or more nuclei 31n at the interface to the orientation control layer 13.

Thus, there is obtained a Ru continuous film of preferably the thickness of 10 nm for the foundation layer 31 such that the crystal grains 31a of the generally identical grain diameter are contacted with each other at the grain boundary 31b. As a result of such a growth mechanism, each Ru crystal grain 31a in the foundation layer 31 includes therein at least one, generally a plurality of nuclei 31n.

Further, the crystal nuclei 31n are not limited to Pt but may be formed of W, Ag, Au, or the like, or may be formed of an alloy containing one or more of these elements, as long as they function as the growth nuclei of the Ru crystal grains 31a. Further, the nuclei 31n may be formed of any of Ru, a Ru alloy, Ti, Ta, Co and a CoPt alloy. In this case, the Ru alloy may contain, in addition to Ru, Co, Co, Fe, Ni, W and Mn.

On the other hand, the foundation layer 14 is formed of a large number of crystal grains 14a of Ru or a Ru—X alloy and a space 14b separating the crystal grains 14a from each other. The crystal grains 14a causes a growth in the film thickness direction from the surface of the first foundation layer 31 and form a columnar structure reaching the interface to the recording layer 15. Here, it should be noted that each crystal grain 14a is formed of one or more of single crystals is grown epitaxially from the underlying crystal grains 31a.

The second foundation layer 14 has a film thickness in the range of 2 nm-16 nm, such as 5 nm, for example, and is formed of Ru or a Ru—X alloy (X=at least one of Co, Cr, Fe, Ni and Mn) having an hcp crystal structure and containing Ru as the principal component.

When the thickness of the second foundation layer 14 is reduced below 2 nm, the quality of the crystal is degraded. When the thickness is increased beyond 16 nm, on the other hand, there is caused degradation in the orientation and there arises problems such as blur at the time of recording. From the viewpoint of isolation of the magnetic particles in the recording layer 15, it is preferable to form the second foundation layer 14 to have a film thickness in the range of 3 nm-16 nm. From the view point of spacing loss, it is further preferable that the second foundation layer 14 has a film thickness of 3 nm-10 nm.

Further, by using a material of hcp crystal structure such as Ru or Ru—X alloy for the second foundation layer 14, it becomes possible to align the easy axis of magnetization of the magnetic particles in the recording layer 15 and having the hcp structure in a direction perpendicular to the substrate surface. For the second foundation layer 14, it is preferable to use Ru from the view point of excellence of crystal growth.

In the second foundation layer 14, the space 14b is formed so as to surround the crystal grains 14a and such that the space 14b reaches from the bottom surface of the crystal grains 14a to the interface to the recording layer 15 as can be seen in FIG. 5. This space 14b may be formed so as to expand toward to the top part of the crystal grains 14a. According to the investigation of the inventor of the present invention based on the TEM images taken from the cross section of the perpendicular magnetic recording medium thus formed, there are more often the case in which the space is formed with increased size around the upper half of the crystal grains than the lower half. By providing the foundation layer 14 of such a construction, it becomes possible to isolate the magnetic particles 15a with suitable degree in the recording layer 15 formed on the crystal grains 14a. Such a foundation layer 14 can be formed by setting the pressure of the rare gas ambient such as an Ar gas or the deposition rate of the foundation layer 14 to a predetermined range.

With the foundation layer 14, it is preferable that the crystal grains 14a has an average grain diameter of 2 nm-10 nm (more preferably 5 nm-10 nm) in the in-plane direction. With this, controllability of grain diameter is improved for the crystal grains 15a in the recording layer 15 grown on the crystal grains 14a. Further, it is preferable that the space 14b has an average width in the range of 1 nm-2 nm. With this controllability of the gap between the magnetic particles 15a is improved inside the recording layer 15. Preferably, the gap between the magnetic particles 15a is larger than 2 nm but does not exceed 3 nm.

The recording layer 15 has a film thickness of 6 nm-20 nm and is formed of the magnetic particles 15a having the columnar structure and the grain boundary phase 15b of a non-magnetic material surrounding the magnetic particles 15a and physically isolating adjacent magnetic particles 15 from each other. The magnetic particles 15a of the columnar structure extend in the film thickness direction and the grain boundary phase 15b fills the gap between the magnetic particles 15a that are arranged in the in-plane direction with a large number.

The magnetic particles 15a are formed of any of the materials selected from the group consisting of Ni, Fe, Co, a Ni alloy, a Fe alloy, CoCrTa, CoCrPt, and a Co alloy containing CoCrPt-M. Here, M is selected from B, Mo, Nb, Ta, W, Cu and an alloy thereof. The magnetic particles 15a have an easy axis of magnetization in the film thickness direction. Further, the magnetic particles 15a preferably have a (001) surface in the film thickness direction, and hence in the growth direction, in the case the ferromagnetic alloy constituting the magnetic particles 15a has an hcp structure.

In the case the magnetic particles 15a is formed of a CoCrPt alloy, the Co content is set to 50 atomic % to 80 atomic %, the Cr content is set to 5 atomic % to 20 atomic %, and the Pt content is set to 15 atomic % to 30 atomic %. By incorporating larger amount of Pt than in the conventional perpendicular magnetic recording media, it becomes possible to increase the perpendicular anisotropic field, while this enables to increase the coercive force. While it has been recognized that it is difficult to grow the magnetic materials containing such high Pt content epitaxially on the foundation layer predominantly of Cr, the present embodiment enables formation of magnetic particles 15a of excellent crystal quality by using the foregoing materials for the magnetic particles 15a.

On the other hand, the grain boundary phase 15b is formed of a non-magnetic material not forming solid solution or compound with the ferromagnetic alloy constituting the ferromagnetic particles 15a. The grain boundary phase 15b may be a compound of an element selected from the group consisting of Ai, Al, Ta, Zr, Y, Ti and Mg and at least one element selected from the group consisting of O, N and C. Thus, for the grain boundary phase 15b, it is possible to use an oxide such as $SiO_2$, $Al_2O_3$, $Ta_2O_5$, $ZrO_2$, $Y_2O_3$, $TiO_2$ and MgO, a nitride such as $Si_3N_4$, AlN, TaN, ZrN, TiN and $Mg_3N_2$, or a carbonate such as SiC, TaC, ZrC and TiC. Because the magnetic particles 15a are isolated physically from the adjacent magnetic particles 15a by such a grain boundary phase 15b of non-magnetic material, there is reduced the magnetic interaction between the magnetic particles 15a, and it becomes possible to reduce the medium noise.

The non-magnetic material constituting the grain boundary phase 15b is preferably formed of an insulating material. Thereby, it becomes possible to reduce the magnetic interaction between the magnetic particles 15b caused as a result of tunneling effect of the electrons that become the cause of ferromagnetism.

With regard to volumetric proportion of the grain boundary phase 15b, it is preferable to set the volumetric proportion to the range of 2 vol % to 40 vol % with reference to the volume of the recording layer 15. When the volumetric concentration becomes less than 2 vol %, it is not possible to separate the magnetic particles 15a sufficiently and it becomes no longer possible to isolate the magnetic particles sufficiently. On the other hand, when the volumetric proportion exceeds 40%, saturation magnetization of the recording layer 15 is degraded significantly and the output at the time of playback is decreased. Further, from the viewpoint of isolation of the ferromagnetic particles 15a and from the view point of variation of the perpendicular alignment, it is particularly preferable to set the volumetric proportion of the grain boundary phase 15b to the range of 8 vol % to 30 vol %.

Further, the protective film 16 has a thickness of 0.5 nm-15 nm, for example, and is formed of an amorphous carbon, hydrogenated carbon, carbon nitride, aluminum oxide, or the like.

Further, the lubrication layer 18 may be formed of a lubricant having a thickness of 0.5 nm-5 nm and having a perfluoropolyether principal chain. For the lubricant, it is possible to use ZDol or Z25 manufactured by Monte Fluos, or Z tetraol or AM3001 manufactured by Ausimont. The lubrication layer 18 may be provided or may be not provided, depending on the material of the protective film 16.

With the perpendicular magnetic recording medium 20 of the present embodiment, in which the crystal grains 14a of the foundation layer 14 are separated from each other by the gap 14b, the magnetic particles 15a of the recording layer 15 are formed with mutual separation, and excellent distribution is attained for the grain diameter of the magnetic particles 15*a*. Thereby, it becomes possible to reduce or uniformize the interaction between the magnetic particles 15*a*. Thereby, the medium noise is reduced.

With the magnetic recording medium 20 of the present invention, in which the first foundation layer 31 is formed in the form of a continuous film of the crystal grains 31*a* of the generally identical grain diameter as set forth before, it becomes possible to suppress the variation of grain diameter of the crystal grains 14*a* in the foundation film 14 formed thereon, while this leads to the suppression of variation of the grain diameters of the magnetic particles 15*a* in the recording layer 15.

Figure 6A:
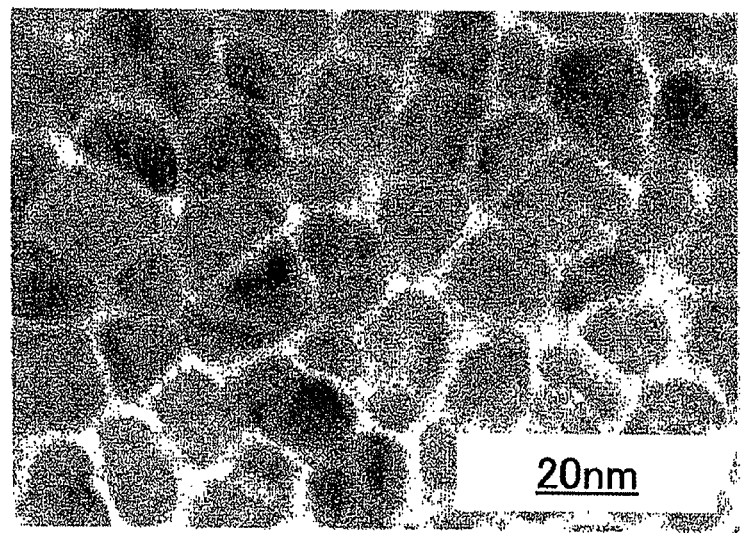
FIGS. 6A and 6B are diagrams respectively showing the state of the magnetic particles and particle diameter distribution of the perpendicular magnetic recording medium of the present invention.
Figure 6B:
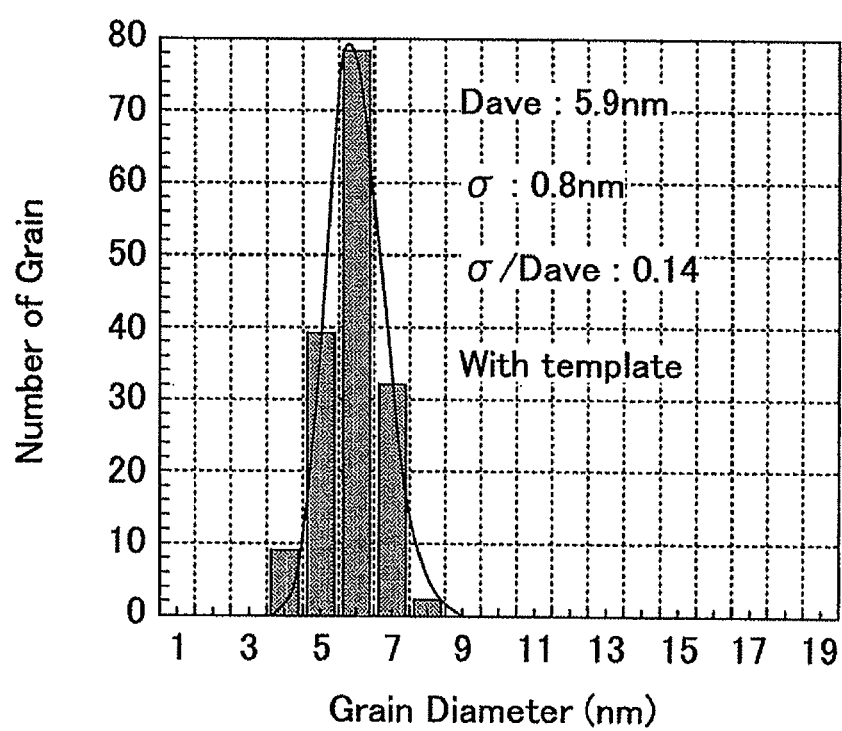

FIG. 6A shows an electron microscopic image of the recording layer 15 of the perpendicular magnetic recording medium 20 according to the first embodiment of the present invention, while FIG. 6B shows the grain diameter distribution of the magnetic particles in the recording layer 15 of FIG. 6A.

Referring to FIG. 6A, the dark part represents the magnetic particles 15*a* and the while part represents the grain boundary phase 15*b*, wherein it can be seen that each of the magnetic particles 15*a* is surrounded by the grain boundary phase 15*b* and is isolated from other magnetic particles 15*a*.

Referring to FIG. 6B, it can be seen that the magnetic particles 15*a* have an average grain diameter ($D_{ave}$) of 5.9 nm in the recording layer 15, the grain diameter distribution σ thereof is 0.8 nm, and that the ratio of the grain boundary distribution σ to the average grain diameter $D_{ave}$ ($\sigma/D_{ave}$) is 0.14.

Figure 7A:
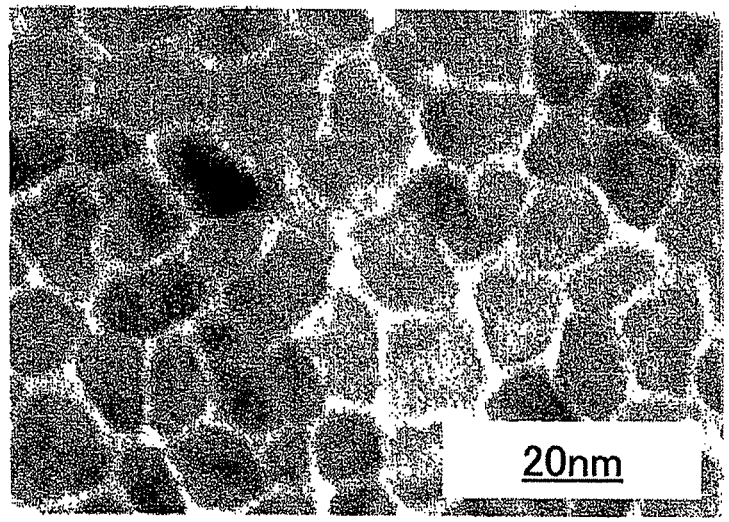
FIGS. 7A and 7B are diagrams respectively showing the state of the magnetic particles and particle diameter distribution of the perpendicular magnetic recording medium according to a comparative reference.
Figure 7B:
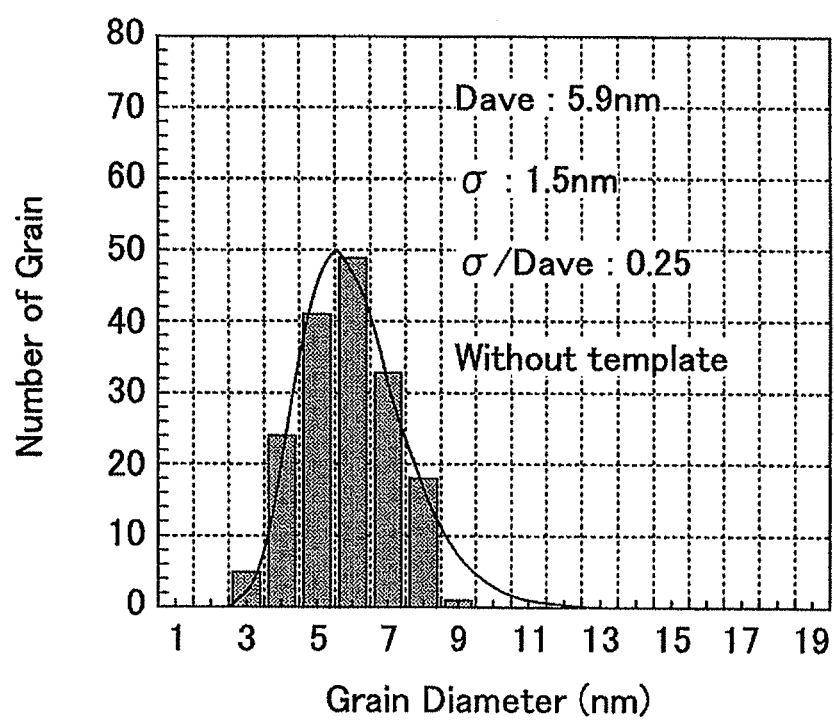

On the other hand, FIG. 7A shows an electron microscopic image of the recording layer for the case formation of the nuclei 31*n* is omitted in the perpendicular magnetic recording medium 20, while FIG. 7B shows the distribution of the particle diameter of the magnetic particles 15*a* in the recording layer 15 of FIG. 7A.

Referring to FIG. 7A, it is also noted that each of the magnetic particles 15*a* is surrounded in the recording layer by the grain boundary phase 15*b* and each magnetic particle is 15*a* is isolated form other magnetic particles 15*a* also in this comparative reference, wherein it can be seen from FIG. 7B that the grain diameter distribution is diffused and that the distribution σ has now reached the value of 1.5 nm even though the average grain diameter $D_{ave}$ remains at 5.9 nm. Thereby, the ratio $\sigma/D_{ave}$ is increased to 0.25.

Figure 8A:
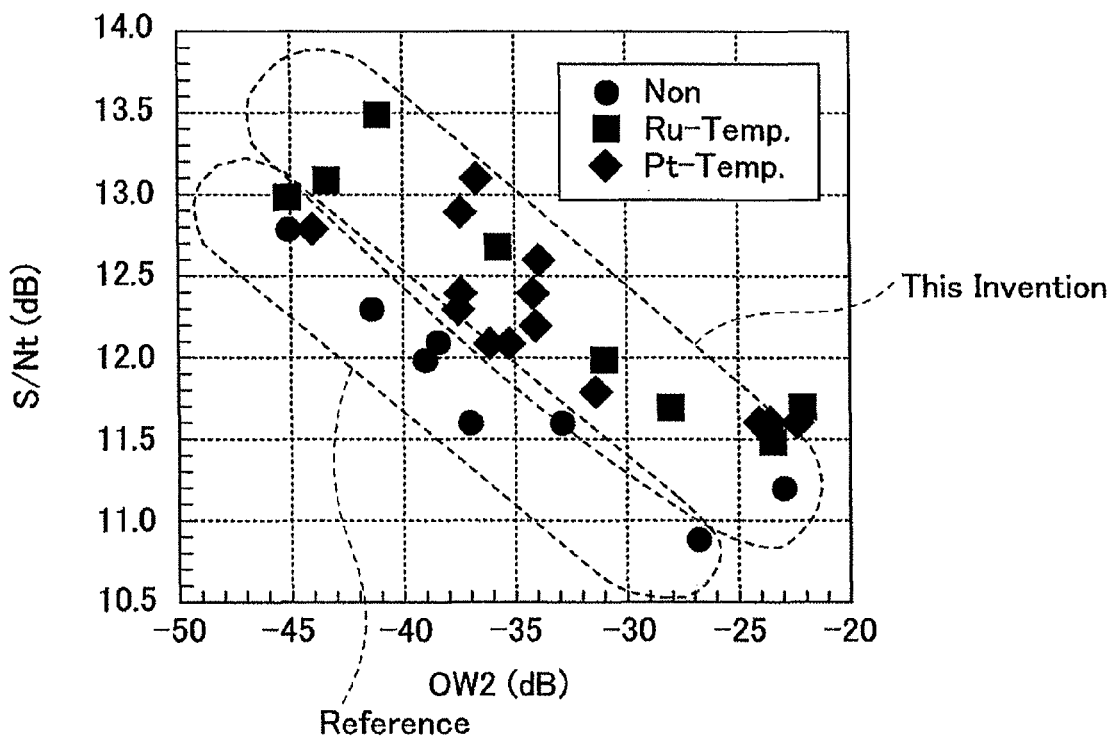
FIG. 8A is a diagram showing the effect of the present invention in comparison with a comparative reference.

FIG. 8A is a diagram showing the relationship between the signal-to-noise ratio (S/Nt) and overwrite characteristics (OW2) obtained for the perpendicular magnetic recording medium 20 of the present embodiment in comparison with the result of the perpendicular magnetic recording medium of the comparative reference in which formation of the nuclei 31*n* is omitted.

Referring to FIG. 8A, the solid circles therein represent the results for the comparative reference, while the solid squares represent the case in which the nuclei 31*n* are formed as a result of deposition of the Ru particles. Further the solid diamonds represent the case in which formation of the nuclei 31*n* is formed as a result of deposition of Pt particles. Here, it should be noted that measurement of the overwrite characteristics OW2 is made by writing a low frequency signal into the magnetic recording medium 20 with the frequency of 100 kfci, followed by writing a high frequency signal with the frequency of 500 kfci, and reading thereafter the low frequency signal of the frequency of 100 kfci. The larger the value of the signal-to-noise ratio, the superior is the performance of the perpendicular magnetic medium. Further, the larger the absolute value of the overwrite characteristics OW2, the superior is the performance of the perpendicular magnetic recording medium.

Referring to FIG. 8A, it can be seen that the signal-to-noise ratio is improved over the comparative reference as a result of the present invention.

Figure 8B:
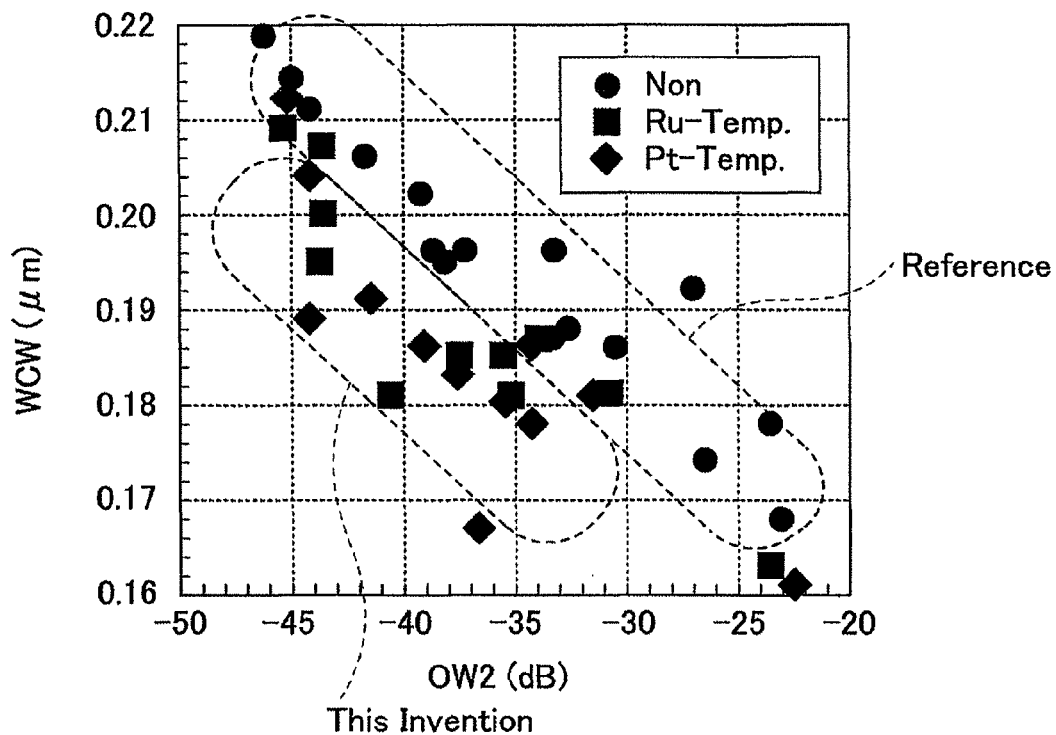
FIG. 8B is another diagram showing the effect of the present invention in comparison with a comparative reference.

FIG. 8B is a diagram showing the relationship between the write core width (WCW) and overwrite characteristics (OW2) obtained for the perpendicular magnetic recording medium 20 of the present embodiment in comparison with the result of the perpendicular magnetic recording medium of the comparative reference in which formation of the nuclei 31*n* is omitted.

Referring to FIG. 8B, the solid circles therein represent the results for the comparative reference, while the solid squares represent the case in which the nuclei 31*n* are formed as a result of deposition of the Ru particles. Further the solid is diamonds represent the case in which formation of the nuclei 31*n* is formed as a result of deposition of Pt particles. The smaller the value of the write core width WCW, the superior is the performance of the perpendicular magnetic recording medium.

Referring to FIGS. 8A and 8B, it can be seen that both the signal-to-noise ratio and the write core width WCW are improved over the comparative reference.

Figure 8C:
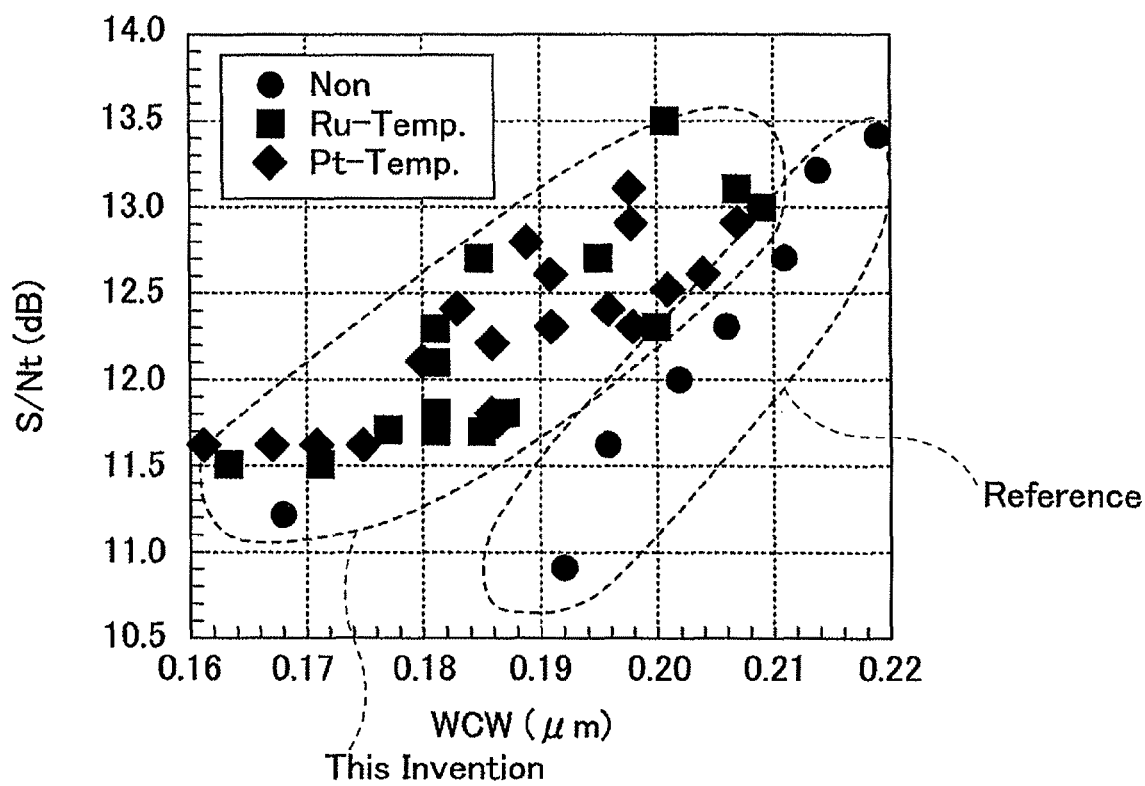
FIG. 8C is another diagram showing the effect of the present invention in comparison with a comparative reference.

FIG. 8C is a diagram showing the relationship between the signal-to-noise ratio (S/Nt) and the write core width (WCW) obtained for the perpendicular magnetic recording medium 20 of the present embodiment in comparison with the result of the perpendicular magnetic recording medium of the comparative reference in which formation of the nuclei 31*n* is omitted.

Referring to FIG. 8C, the solid circles therein represent the results for the comparative reference, while the solid squares represent the case in which the nuclei 31*n* are formed as a result of deposition of the Ru particles. Further the solid diamonds represent the case in which formation of the nuclei 31*n* is formed as a result of deposition of Pt particles.

Referring to FIG. 8C, it can be seen that both the signal-to-noise ratio and the write core width WCW are improved over the comparative reference.

Next, manufacturing method of the perpendicular magnetic recording medium 20 of the present embodiment will be explained.

First, the surface of the substrate 11 is cleaned, and after drying, the soft-magnetic backing layer 12 explained above is formed on the substrate by an electroless plating process, electrolytic plating process, sputtering process, vacuum evaporation deposition process, or the like.

Next, using a sputtering apparatus, the orientation control layer 13 is formed on the soft-magnetic backing layer 12 while using the sputter target of the material explained above. Preferably, the sputtering apparatus is a ultra vacuum sputtering apparatus capable of evacuating to the pressure of 10-7 Pa in advance. More in detail, the orientation control layer 13 is formed by a d.c. magnetron sputtering process in the rare gas ambient of an Ar gas, or the like, while setting the pressure to 0.4 Pa. Therein, it is preferable not to carry out heating of the substrate 11. Thereby, it becomes possible to suppress the crystallization or growth of the microcrystals in the soft-magnetic backing layer 12. Of course, it is possible to heat the backing layer 12 to the temperature, such as 150° C. or less, where there occurs no crystallization or growth of the microcrystals in the soft-magnetic backing layer 12. Further, it is possible to cool the substrate 11, for example to −100° C. Further, when the facility allows, it is possible to cool the substrate to the temperature lower than −100° C. The heating or cooling explained for the substrate 11 is applicable also to the process of forming the orientation control layer 13, the foundation layers 31 and 14 and the recording layer 15.

Next, while using the same sputtering apparatus, and while using a target of Pt or Ru, the nuclei 31n are formed on the orientation control layer 13 by a d.c. magnetron sputtering process conducted at room temperature in an Ar gas ambient of the pressure of 5.33 Pa (40 mTorr) with the deposition rate of 0.5 nm/seconds for the deposition duration corresponding to the thickness of 1 nm, which may be about 2 seconds. As explained before, the nuclei 31n thus formed distribute at random on the orientation control layer 13. It should be noted that such nuclei 31n may be formed of a single Pt particle or an aggregate of a plurality of Pt particles. Further, in the case the nuclei 31n are formed by the sputtering process, each nucleus 31n has a size much smaller than the island pattern 61a of FIG. 2, which was formed by a patterning process.

Next, by using the same sputtering apparatus, and while using the sputtering target of Ru or the Ru—X alloy explained before, the first foundation layer 31 is formed on the orientation control layer 13 similarly as explained before.

More specifically, sputtering is conducted upon the orientation control layer 13, on which such nuclei 31n are formed, by a d.c. magnetron sputtering process of room temperature while using the target of Ru or the Ru—X alloy under the Ar gas ambient of 0.667 Pa (5 mTorr) with a deposition rate of 2 nm/second or more, such as the deposition rate of 2.5 nm/second. With this, the foundation layer 31 is formed continuously in a manner to cover the nuclei 31n with a thickness of 10 nm, for example.

Next, by using the same sputtering apparatus, and while using the sputtering target of Ru or the Ru—X alloy explained before, the second foundation layer 14 is formed on the first foundation layer 31. In more detail, the foundation layer 14 is formed by the d.c. magnetron sputtering process in the Ar gas ambient while setting the deposition rate to 0.1 nm/second or more but not exceeding 2 nm/second, such as the deposition rate of 0.8 nm/second, and setting the ambient gas pressure to 2.66 Pa or higher but not exceeding 26.6 Pa, such as 53.2 Pa (40 mTorr). By setting the deposition rate and the ambient gas pressure to the foregoing range, it becomes possible to form the foundation layer 14 in the manner that the crystal grains 14a are separated from each other by the gap 14b.

When the deposition rate is set to be smaller than 0.1 nm/second in the step of forming the foundation layer 14, there occurs a serious degradation of production efficiency, while when the deposition rate is set to be larger than 2 nm/second, there is a risk that there occurs no void formation and a continuous film of crystal grains and the crystal grain boundary part may be obtained. Further, when the rare gas pressure is set to be lower than 2.66 Pa, there occurs no void formation and a continuous film of the crystal grains and the crystal grain boundary part may be formed. When the rare gas pressure is set to be larger than 26.6 Pa, on the other hand, the rare gas may be incorporated into the crystal grains and the crystal quality may be degraded. Because of the reasons noted above, it is preferable not to heat the substrate 11 at the time of formation of the foundation layer 14. The sputtering process may be conducted while using the sputtering power of 50 W, for example.

Next, using a sputtering apparatus, the recording layer 15 is formed on the foundation layer 14 while using the sputter target of the material explained above.

More specifically, the recording layer 15 is formed by an RF magnetron sputtering process in the ambient of an inert gas or an inert gas added with oxygen or nitrogen, which is to be introduced into the grain boundary phase 15b, while using a composite sputter target of the magnetic material of the magnetic particles 15a and the non-magnetic material of the grain boundary phase 15b. Alternatively, it is possible to sputter the magnetic material of the magnetic particles 15a and the non-magnetic material of the grain boundary phase 15b at the same time. The pressure at the time of film formation may be set to the range of 2.00 Pa-8.00 Pa, more preferably to the range of 2.00 Pa to 3.99 Pa.

From the step of forming the orientation control layer 13 up to the step of forming the recording layer 15, it is preferable to hold the substrate 3 carrying thereon the various layers in a vacuum ambient or in the ambient used for film formation in view of maintaining a clean surface state.

Next, the protective film 16 is formed on the recording layer 15 by a sputtering process, FCA (filtered Cathodic arc) process, or the like. Further, the lubrication layer 18 is applied upon the surface of the protective film 16 by a dip coating process, spin coating process, liquid level lowering process, or the like. With the foregoing, the perpendicular magnetic recording medium of the present embodiment is formed.

According to the manufacturing method of the perpendicular magnetic recording medium of the present embodiment, it becomes possible to easily isolate the magnetic particles grown with an arrangement conformal to the arrangement of the crystal grains underneath, by forming the crystal grains in the manner separated from each other with the gap by merely setting the deposition rate and the pressure of the inert gas at the time of formation of the foundation layer 14.

In the foregoing process, it should be noted that formation of the nuclei 31n is not limited to the sputtering of Pt or Ru but may be conducted by sputtering of W, Ag or Au, or may be conducted by sputtering of an alloy containing one or more of these elements. Further, the sputtering may be conducted by using any of Ru, a Ru alloy, Ti, Ta, Co and a CoPt alloy for the target. In this case, the Ru alloy may contain, in addition to Ru, Co, Co, Fe, Ni, W and Mn.

Second Embodiment

Figure 9:
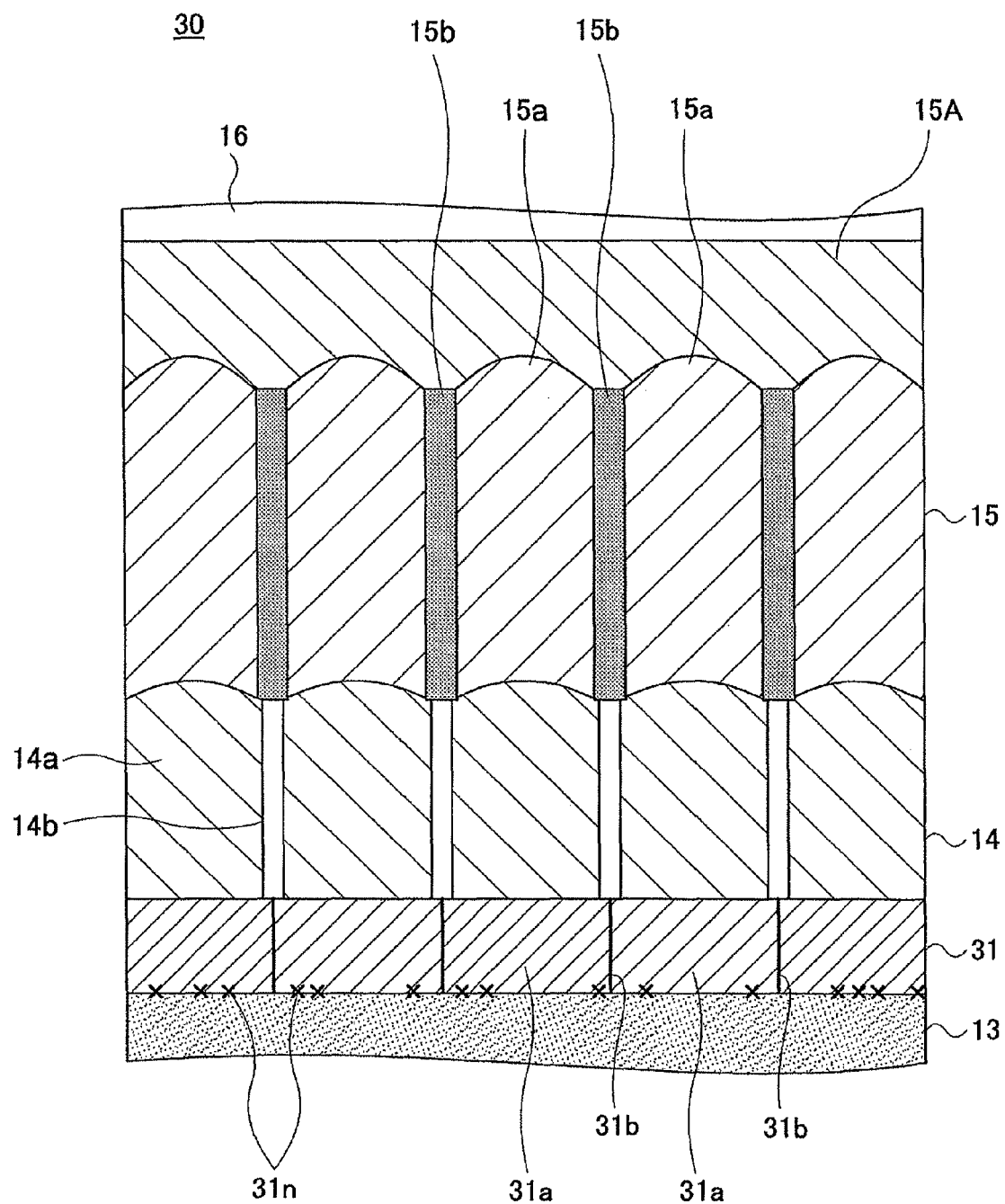
FIG. 9 is a diagram showing the construction of a perpendicular magnetic recording medium according to a second embodiment of the present invention.

FIG. 9 shows the construction of perpendicular magnetic recording medium 30 according to a second embodiment of the present invention. In the drawings, those parts explained before are designated by the same reference numerals and the description thereof will be omitted.

Referring to FIG. 9, the present embodiment forms another recording layer 15A having a smaller perpendicular magnetic anisotropy than that of the recording layer 15 between the magnetic recording layer 15 and the protective film 16 of the perpendicular magnetic recording medium 20 of FIGS. 4 and 5 in the form of a continuous film.

With such a construction, the problem of difficulty of writing caused as a result of the recording layer 15 having a very large perpendicular magnetic anisotropy and resulting in excessively stable magnetization in the recording layer 15, is successfully eliminated, and a perpendicular magnetic recording medium for easy writing is obtained.

The recording layer 15A may be formed by using a CoCr alloy containing Cr with the range of 13-19 atomic %.

Third Embodiment

Figure 10:
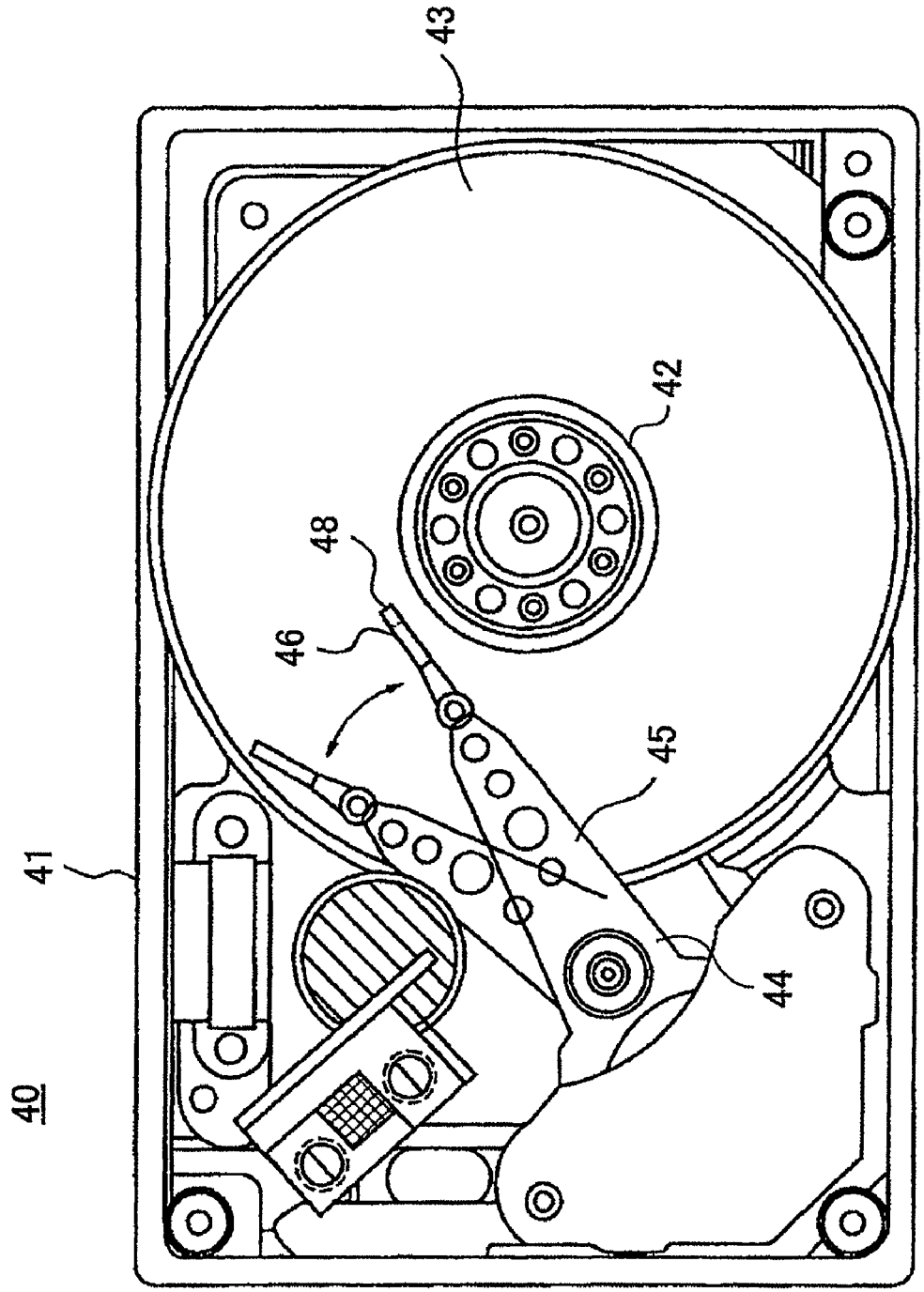
FIG. 10 is a diagram showing the construction of a magnetic recording apparatus according to a third embodiment of the present invention.

FIG. 10 shows the construction of a perpendicular magnetic recording apparatus 40 according to a third embodiment of the present invention.

Referring to FIG. 10, the magnetic recording apparatus 40 includes a housing 41, wherein there are provided, in the housing 41, a hub 42 driven by a spindle motor not shown, a perpendicular magnetic recording medium 43 fixed upon the hub 42 and rotated therewith, an actuator unit 44, an arm 45 and a suspension 46 mounted upon the actuator unit 44 and is moved in a radial direction of the perpendicular magnetic recording medium 43, and a magnetic head 48 supported upon the suspension 46.

With the magnetic recording apparatus 40 of FIG. 10, the perpendicular magnetic recording medium 20 or 30 of the first or second embodiment of the present invention is used for the perpendicular magnetic recording medium 43. While there is shown only one perpendicular magnetic recording medium 43 in FIG. 10, it should be noted that the number of the magnetic recording medium 43 is not limited to one but it is possible to provide two or more magnetic recording media 43. The present invention includes also the case in which at least one of the plurality of the magnetic recording media 43 is formed of the perpendicular magnetic recording medium 20 or 30 of the first or second embodiment.

Further, the magnetic recording medium 40 of the present embodiment is not limited to the one shown in FIG. 10. Further, the perpendicular magnetic recording medium 43 used with the present invention is not limited to a magnetic disk but it is also possible to be implemented in the form of a magnetic tape.

While the present invention has been explained heretofore with reference to preferred embodiment, it should be noted that the present invention is not limited to such a specific embodiment and various variations and modifications may be made within the scope of the present invention as set forth in patent claims.

What is claimed is:

1. A perpendicular magnetic recording medium comprising:
   a substrate;
   a soft-magnetic backing layer formed over said substrate;
   an orientation control layer formed over said soft-magnetic backing layer;
   a first foundation layer of a continuous film of Ru or a Ru alloy formed on said orientation control layer;
   a second foundation layer comprising a plurality of crystal grains of Ru or a Ru alloy formed on said first foundation layer with a gap separating said plurality of crystal grains from each other; and
   a recording layer comprising a plurality of magnetic particles formed on said second foundation layer respectively in correspondence to said plurality of crystal grains, each of said plurality of magnetic particles having an easy axis of magnetization in a direction generally perpendicular to a substrate surface, and a non-magnetic grain boundary phase isolating said plurality of magnetic particles from each other,
   wherein said first foundation layer comprises a plurality of crystal grains formed in contact with each other at respective grain boundaries,
   one of said plurality of crystal grains constituting said second foundation layer being formed in correspondence to one of said plurality of crystal grains constituting said first foundation layer,
   wherein there are provided a plurality of nuclei at an interface between said one crystal grain of said plurality of crystal grains constituting said first foundation layer and said orientation control layer, and
   wherein each of said plurality of nuclei comprises any of the elements of Pt, W, and CoPt or an alloy containing one or more of said elements.

2. The perpendicular magnetic recording medium as claimed in claim 1, wherein said orientation control film comprises a Ta film having a thickness of 2.0 nm or more.

3. The perpendicular magnetic recording medium as claimed in claim 1, wherein said plurality of magnetic particles constituting said recording layer contains Co or Cr as a predominant element, and wherein said non-magnetic grain boundary phase comprises any of a metal oxide, a metal nitride, a metal carbide and carbon.

4. The perpendicular magnetic recording medium as claimed in claim 1, wherein, in each of said first and second foundation layers, said Ru alloy has an hcp structure and contains at least one element, in addition to Ru, selected from the group consisting of Co, Cr, Fe, Ni, W and Mn.

5. A magnetic recording apparatus, comprising:
   a perpendicular magnetic recording medium;
   a magnetic head scanning over said perpendicular magnetic recording medium; and
   a driving system for causing said magnetic head to scan over said perpendicular magnetic recording medium,
   said perpendicular magnetic recording medium comprising:
   a substrate;
   a soft-magnetic backing layer formed over said substrate;
   an orientation control layer formed over said soft-magnetic backing layer;
   a first foundation layer of a continuous film of Ru or a Ru alloy formed on said orientation control layer;
   a second foundation layer comprising a plurality of crystal grains of Ru or a Ru alloy formed on said first foundation layer and a gap separating said plurality of crystal grains from each other; and
   a recording layer comprising a plurality of magnetic particles formed on said second foundation layer respectively in correspondence to said plurality of crystal grains, each of said plurality of magnetic particles having an easy axis of magnetization in a direction generally perpendicular to a substrate surface, and a non-magnetic grain boundary phase isolating said plurality of magnetic particles from each other,
   wherein said first foundation layer comprises a plurality of crystal grains formed in contact with each other at respective grain boundaries,
   one of said plurality of crystal grains constituting said second foundation layer being formed in correspondence to one of said plurality of crystal grains constituting said first foundation layer, and
   wherein there are provided a plurality of nuclei, formed of Pt or an alloy thereof, at an interface between said one crystal grain of said plurality of crystal grains constituting said first foundation layer and said orientation control layer.

6. The perpendicular magnetic recording medium as claimed in claim 1, wherein said plurality of nuclei is formed by sputtering at a first deposition rate,
   said first foundation layer is formed by sputtering at a second deposition rate, and
   said second deposition rate is higher than said first deposition rate.

7. The perpendicular magnetic recording medium as claimed in claim 6, wherein said first deposition rate is less than 2 nm/second, and said second deposition rate is 2 nm/second or more.

8. The perpendicular magnetic recording medium as claimed in claim 6, wherein said first deposition rate is 0.5 nm/second, and said second deposition rate is 2.5 nm/second.

9. The perpendicular magnetic recording medium as claimed in claim 1, wherein said plurality of nuclei is formed by sputtering at a first rare gas pressure,
 said first foundation layer is formed by sputtering at a second rare gas pressure, and
 said second rare gas pressure is lower than said first rare gas pressure.

10. The perpendicular magnetic recording medium as claimed in claim 9, wherein said first rare gas pressure is 10 mTorr or more, and said second rare gas pressure is less than 10 mTorr.

11. The perpendicular magnetic recording medium as claimed in claim 9, wherein said first rare gas pressure is 40 mTorr, and said second rare gas pressure is 5 mTorr.

12. The perpendicular magnetic recording medium as claimed in claim 1, wherein said first foundation layer has a grain structure having generally identical grain diameter, which is formed by a competitive growth process.

* * * * *